United States Patent
McCarty et al.

(10) Patent No.: US 7,493,402 B2
(45) Date of Patent: Feb. 17, 2009

(54) METHODS AND SYSTEMS FOR COORDINATING SESSIONS ON ONE OR MORE SYSTEMS

(75) Inventors: Scott F. McCarty, Salt Lake City, UT (US); Jeanette L. Hammock, Sandy, UT (US)

(73) Assignee: SunGard SCT Inc., Malvern, PA (US)

( * ) Notice: Subject to any disclaimer, the term of this patent is extended or adjusted under 35 U.S.C. 154(b) by 0 days.

(21) Appl. No.: 11/424,817

(22) Filed: Jun. 16, 2006

(65) Prior Publication Data
US 2007/0067444 A1    Mar. 22, 2007

Related U.S. Application Data

(60) Division of application No. 10/010,783, filed on Nov. 13, 2001, now Pat. No. 7,093,020, which is a continuation of application No. 09/896,848, filed on Jun. 29, 2001, now abandoned.

(60) Provisional application No. 60/214,937, filed on Jun. 29, 2000.

(51) Int. Cl.
*G06F 15/16* (2006.01)
(52) U.S. Cl. .......................................... 709/229; 726/8
(58) Field of Classification Search ................ 709/224, 709/227–229; 726/8–10
See application file for complete search history.

(56) References Cited

U.S. PATENT DOCUMENTS

| | | | |
|---|---|---|---|
| 5,655,077 A | 8/1997 | Jones et al. | |
| 5,745,573 A | 4/1998 | Lipner et al. | |
| 5,764,767 A | 6/1998 | Beimel et al. | |
| 6,076,108 A | 6/2000 | Courts et al. | |
| 6,141,423 A | 10/2000 | Fischer | |
| 6,182,142 B1 | 1/2001 | Win et al. | |
| 6,202,150 B1 | 3/2001 | Young et al. | |
| 6,438,597 B1 | 8/2002 | Mosberger et al. | |
| 6,490,624 B1 * | 12/2002 | Sampson et al. ............ | 709/227 |
| 6,584,505 B1 | 6/2003 | Howard et al. | |
| 6,715,082 B1 | 3/2004 | Chang et al. | |
| 6,978,298 B1 * | 12/2005 | Kuehr-McLaren .......... | 709/223 |
| 7,024,556 B1 * | 4/2006 | Hadjinikitas et al. ........ | 713/168 |

(Continued)

OTHER PUBLICATIONS

Novell Single Sign-On, pp. 1-6, Apr. 1999.

(Continued)

*Primary Examiner*—Larry D Donaghue
(74) *Attorney, Agent, or Firm*—Austin Rapp & Hardman

(57) ABSTRACT

The present invention extends to methods and systems for providing a seamless user interface to one or more web-based external systems and applications that monitor and control access to information, products, and/or services provided by such web-based external systems. Accordingly, the methods and systems enable a user to utilize a single web-based graphical user interface to access external systems with minimal input from the user. Further, the invention coordinates the log-on, log-off, and time-out of the user from the external systems so that user has a seamless on-line experience. The user remains logged into each of the external systems so long as the user is logged into a main system and can log-out of all the external systems by logging out of the main system. In addition, the user is not timed out of any external system unless the user is timed out of the main system.

11 Claims, 10 Drawing Sheets

U.S. PATENT DOCUMENTS 7,093,020 B1 8/2006 McCarty et al.
2002/0138728 A1 9/2002 Parfenov et al.

OTHER PUBLICATIONS

Adi Shamir, Massachusetts Institute of Technology, "How to Share a Secret," Communications of the ACM, Nov. 1979, vol. 22, No. 11, pp. 612-613.

Novell Single Sign-On, http://www.novell.com/documentation/lg/sso2/treetitl.html, pp. 1-70, Oct. 10, 2001.

Tivoli Software, Tivoli® Secure way® Global Sign-On, http://www.tivoli.com/products/index/gso, pp. 1-2, Oct. 10, 2001.

Tivoli Software, Tivoli® Security Products, http://www.tivoli.com/products/solutions/security/products.html, pp. 1, Oct. 10, 2001.

Tivoli Software, Tivoli® Secure Way® Policy Director, http://www.tivoli.com/products/index/secureway_policy_dir/index.html, pp. 1-2, Oct. 10, 2001.

Tivoli Software, Tivoli® Secure Way® Policy Director for MQSeries®, http://www.tivoli.com/products/index/secureway_policy_dir_mqs/index.html, pp. 1-3, Oct. 10, 2001.

Tivoli Software, Tivoli® Secure Way® Privacy Manager, http://www.tivoli.com/products/index/secureway_privacy_mgr/index.html, pp. 1, Oct. 10, 2001.

Tivoli Software, Tivoli® Secure Way® Global Sign-On, http://www.tivoli.com/products/index/gso/index.html, pp. 1-2, Oct. 10, 2001.

Tivoli Software, Tivoli® Risk Manager, http://www.tivoli.com/products/index/secureway_risk_mgr/index.html, pp. 1-3, Oct. 10, 2001.

Tivoli Software, Tivoli® Intrusion Manager, http://www.tivoli.com/products/index/intrusion-mgr/index.html, pp. 1-2, Oct. 10, 2001.

Tivoli Software, Tivoli® Identity Director, http://www.tivoli.com/products/index/identity_dir/index.html, pp. 1-3, Oct. 10, 2001.

Tivoli Software, Tivoli® Secure Way® User Administration, http://www.tivoli.com/products/index/user_admin/index.html, pp. 1-2, Oct. 10, 2001.

Tivoli Software, Tivoli® Secure Way® Security Manager, http://www.tivoli.com/products/index/security_mgt/index.html, pp. 1-2, Oct. 10, 2001.

Tivoli Software, Tivoli® Secure Way® Related Information, http://www.tivoli.com/products/solutions/security/secureway_product_info.html, pp. 1, Oct. 10, 2001.

Tivoli Software, Tivoli® Business Partner Directory, http://www.tivoli.com/Tivoli_Channels/WebPartners.nsf/Tivoli+Partner?OpenForm, pp. 1, Oct. 10, 2001.

Tivoli Software, Tivoli® Product License Information, Tivoli Value-Based Pricing Products, http://www.tivoli.com/products/licensing, pp. 1-4, Oct. 10, 2001.

* cited by examiner

METHODS AND SYSTEMS FOR COORDINATING SESSIONS ON ONE OR MORE SYSTEMS

CROSS-REFERENCE TO RELATED APPLICATIONS

This application is a divisional application of U.S. patent Ser. No. 10/010,783 filed Nov. 13, 2001, now U.S. Pat. No. 7,093,020, which is a continuation application of U.S. patent Ser. No. 09/896,848 filed Jun. 29, 2001 now abandoned, which claims priority of U.S. Provisional Application Ser. No. 60/214,937, filed Jun. 29, 2000. Reference is made to co-pending U.S. patent application Ser. No. 10/010,070, filed Nov. 13, 2001, entitled "Methods and Systems for Coordinating the Termination of Sessions On One or More Systems," which is a continuation application of U.S. patent Ser. No. 09/897,789 filed Jun. 29, 2001, entitled "Methods and Systems for Coordinating the Termination of Sessions On One or More Systems," the disclosures of which are incorporated herein by reference.

BACKGROUND OF THE INVENTION

1. The Field of the Invention

The present invention relates to facilitating communication between various disparate applications and systems. More specifically, the present invention relates to logging into and out of multiple disparate applications and systems, while enabling such applications and systems to track the activities of the user and maintain state. Further, the present invention relates to providing an interface for the user that seamlessly displays information and data from the multiple disparate applications and systems as user accesses the same applications and systems.

2. The Relevant Technology

Storing and controlling information and knowledge has been a continual challenge and pursuit of individuals and businesses alike. From managing access to information stored on paper or microfilm products to protecting information stored on magnetic or optical media, individuals and businesses attempt to control access to and use of selected information. With advances in technology in recent years, the amount of available information has increased dramatically, with the potential for growth in the quantity and quality of available information in the future.

One development that promotes access to different information and knowledge is the Internet. Through the Internet, individuals and businesses can access an assortment of repositories containing varied materials. Typically, web-based repositories limit access to their resources through requiring users to open an account or otherwise become a registered user. Users of these sites commonly create a user account through a registration process that lets the user choose a user identity and a password; i.e. "credentials." Once registered, the user can login to the web site and access the protected resources within the repository.

In addition to the Internet, many organizations and businesses develop intranets or networks to populate information and knowledge between the members of the organization or business. Typically, such intranets are based upon TCP/IP protocols, and are accessible only to authorized employees or users associated with the particular organization or business. These intranets can display information and knowledge as web pages and can use uniform resource locators (URLs) to identify the location of such web pages within the intranet.

One type of organization that can use an intranet is a university or similar institution. A university's intranet typically connects the various buildings and departments and facilitates communication between students, faculty, alumni, and university administration. The user of the network will have a credential to access certain information available through the network. Unfortunately, each user may have multiple identities and credentials to access multiple repositories or different services provided by the university or institution. For instance, a user may use one set of credentials to access an electronic mail (email) account, while using a different set of credentials to access their library account.

Further, each user may have multiple identities and credentials to access external systems or applications not included within the university's network, but which they frequently access from university computers. For example, a student may have credentials allowing the student to use online research resources related to the student's major. Consequently, many users must remember multiple identities and credentials to access different information repositories or services accessible through the university's intranet and the Internet. Attempting to remember multiple identities and credentials is problematic and provides a fertile field for forgotten or inaccurately input identity information or credentials as a user attempts to access resources and information.

In addition to problems associated with remembering multiple identities and credentials, various systems or applications accessible through the intranet or Internet typically require each user to separately access such systems or platforms. For instance, a user may research a project using a third-party system, enroll in courses through another application, system, or platform, and send electronic mail messages through yet another application or system. The user, therefore, must switch from one application or system to another to perform the desired activities and input the requisite identity and credential information. This is a time consuming and tedious process to perform each time a user changes activities.

Accordingly, there is a need for improved methods and systems that overcome or avoid the above problems and limitations.

SUMMARY OF THE INVENTION

The present invention provides systems and methods to present a seamless user interface as a user accesses different web-based external systems, while maintaining the independence of the external systems. The systems and methods enable each external system to maintain state with each user through creating a session for each user that accesses the external systems. Thus, each external system can track user activity on the external system and consequently maintain state. Further, the present invention provides systems and methods to enable a user to create a session on the information system; thereby enabling the information system to track user activity on the information system and consequently maintain state. Additionally, the present invention provides systems and methods to enable the information system, or modules, components, platforms, or the like of the information system to create a session on the external system; thereby enabling the information system to track actions and activities of the external system and consequently maintain state.

According to another aspect of the present invention, each user need only login to the information system and he/she will have automatic access to the other external systems accessible within or through the information system. Similarly, when a user logs-out of the information system, the information system directs the information system to log-out the user from all of the other systems that the user has an active session. Further, the information system maintains the user's login status to those web-based external systems accessed by the user unless there is no activity within a given time period at any of the web-based external systems accessed by the user during that session, i.e., the user's session has timed-out and the external system has terminated the session due to the inactivity of the user.

When a user has been inactive on the information system for a period of time greater than a period defined by an administrator of the information system, i.e., the time-out period, the information system terminates the user's session on the information system. This process is known as being timed-out. Each of the external systems can perform a similar process when the user does not perform an action or input on the external system for an extended period of time.

In one configuration, the information system, such as a university system, includes an integration module that acts as a hub to control access to each of the various systems forming the information system or other systems accessible through the information system. The integration module is adapted to enable a user to login to the information system, while also controlling access to the web-based external systems. Further, the integration module can offer a user multiple services, such as but not limited to e-mail, chat rooms, or the like. This integration module includes a graphical user interface through which the user can input identity information, credentials, and other information, receive information, receive prompts to input additional information, or the like.

This graphical user interface facilitates a seamless user experience. In this experience, the user needs only to login to the integration module, and the user will have automatic access to the other web-based external systems, whether such systems are included within the information system or otherwise accessible through the integration module. This is made possible by the integration module sending a request along with an identifier of the user to the external system and requesting authentication on behalf of the user. The external system uses one of a number of authentication schemes to authenticate the user and establish a session in their system for the identified user. Simultaneously, a session is created between the information system and the external system, thereby allowing the information system to maintain state.

Upon a successful authentication response from the external system, the information system can transparently redirect the uniform resource locator (URL) of the user's browser to the external system, giving the utilized by the user the experience of seamless integration between the two systems.

According to another aspect, the integration module can also log-out or terminate sessions on the external systems when a user's session is voluntarily or involuntarily terminated. This can be achieved voluntarily when a user logs-out, or involuntarily when a user has an extended period of inactivity upon the information system or one of the various web-based external systems. When the user session ends on the web-based integration module, i.e., the user logs-out or is timed-out, the information system will send a request along with an identifier of the user to one or more external systems and request that the user's session be terminated on those systems.

This coordinated log-out and time-out provides the benefit of reduced web server resources, higher security by allowing normal time-outs to occur, and sets up the overall interaction and system state to allow quick and automatic re-authentication to any of the resources previously accessible to the users of the system. In this manner, the integration module can control a user's access to various web-based systems and applications.

Additionally, the invention provides methods for centralizing time-out of the user from the entire system and for maintaining the user's seamless experience even where the user has timed-out of the external system. One such system provides a method for providing a time-out from one or more of the information system and the external system.

The method can include transmitting to one or more external systems to which a user has an established session a request to specify the last active time of the user on the one or more external systems. This is performed when the system has verified that a logged-in user has not accessed the integration module within a specified minimum logout period.

After the integration module receives a response that either identifies the last active time of the user on the external system or indicates that the user is not logged-in to such external system, the integration module records the most recent activity time of the user on the integration module and the one or more external systems as the most recent activity time of the user in the integration module. Finally, if the most recent activity time of the user is outside a specified minimum time-out period, the integration module logs the user out of the integration module and actively logs-out or de-authenticates the user from each external system to which the user is logged-in.

According to yet another embodiment of the invention, after the integration module receives notification that a user has been denied access to one or more external systems, i.e., the user attempts to access a session on an external system which has been timed-out because of inactivity of the user, the integration module searches for access information associated with the one or more external systems. Upon locating the access information related to the user for a particular external system, the integration module interfaces with the one or more external systems to re-establish the user's session on the external system, thereby enabling the user to access the external system. Preferably, the user is unaware of this re-authentication process, thereby preserving a seamless on-line experience.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention extends to methods and systems for providing a seamless user interface to one or more web-based external systems and applications that monitor and control access to information, products, and/or services provided by such web-based external systems. Accordingly, the methods and systems enable a user to utilize a single web-based graphical user interface to access multiple external systems with minimal input from the user. Further, the methods and systems of the invention coordinate the log-on, log-off, and timing-out of the user from the external systems so that user has a seamless user interface experience. The present invention provides integration through a URL-based application program interface (API) allowing external systems to integrate their Web-based applications within the systems of the present invention. The embodiments of the present invention may comprise a special purpose or general-purpose computer including computer hardware, as discussed in detail below.

Embodiments within the scope of the present invention also include computer-readable media for having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
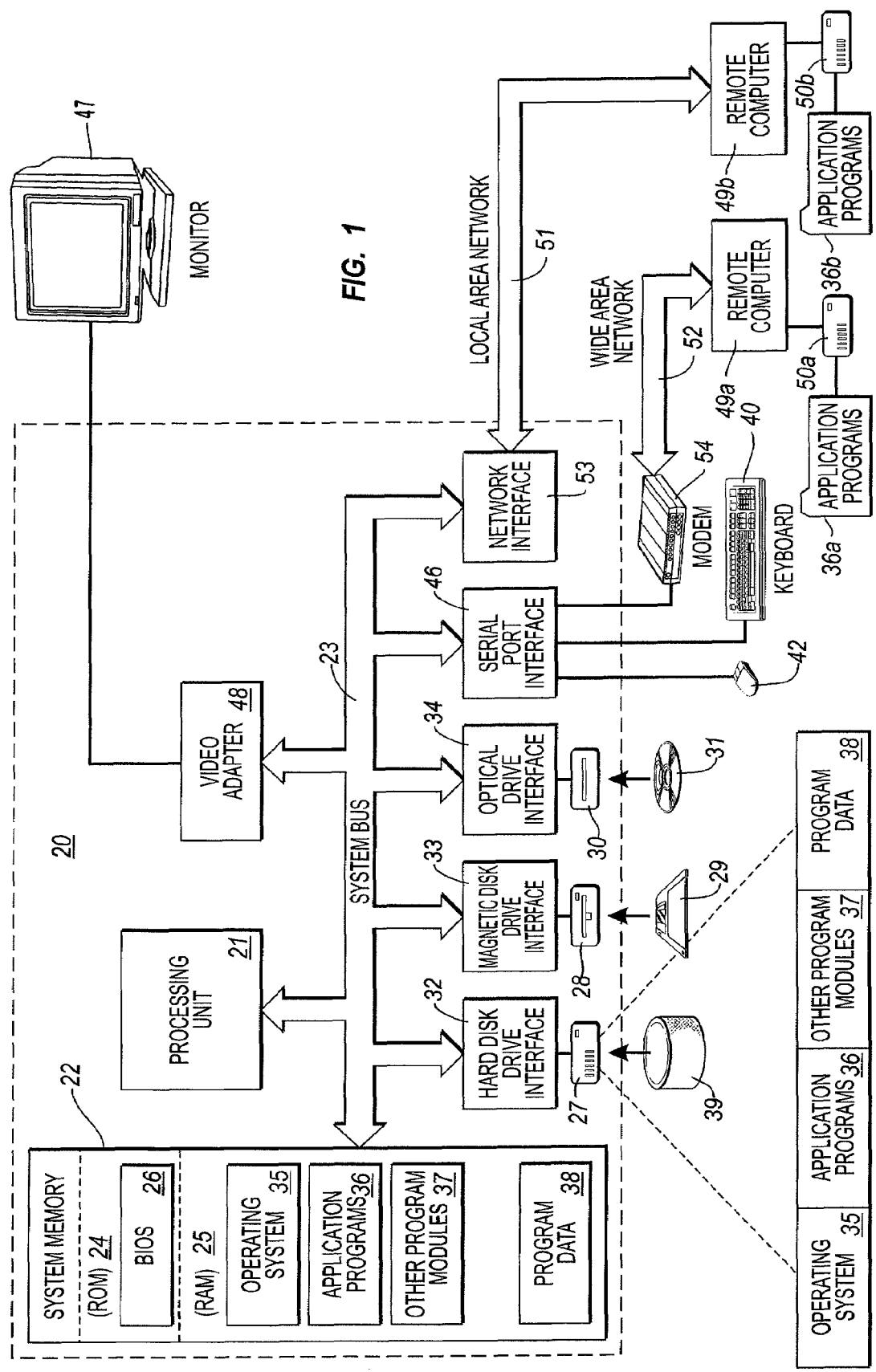
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general-purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules, and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port, or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets, and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
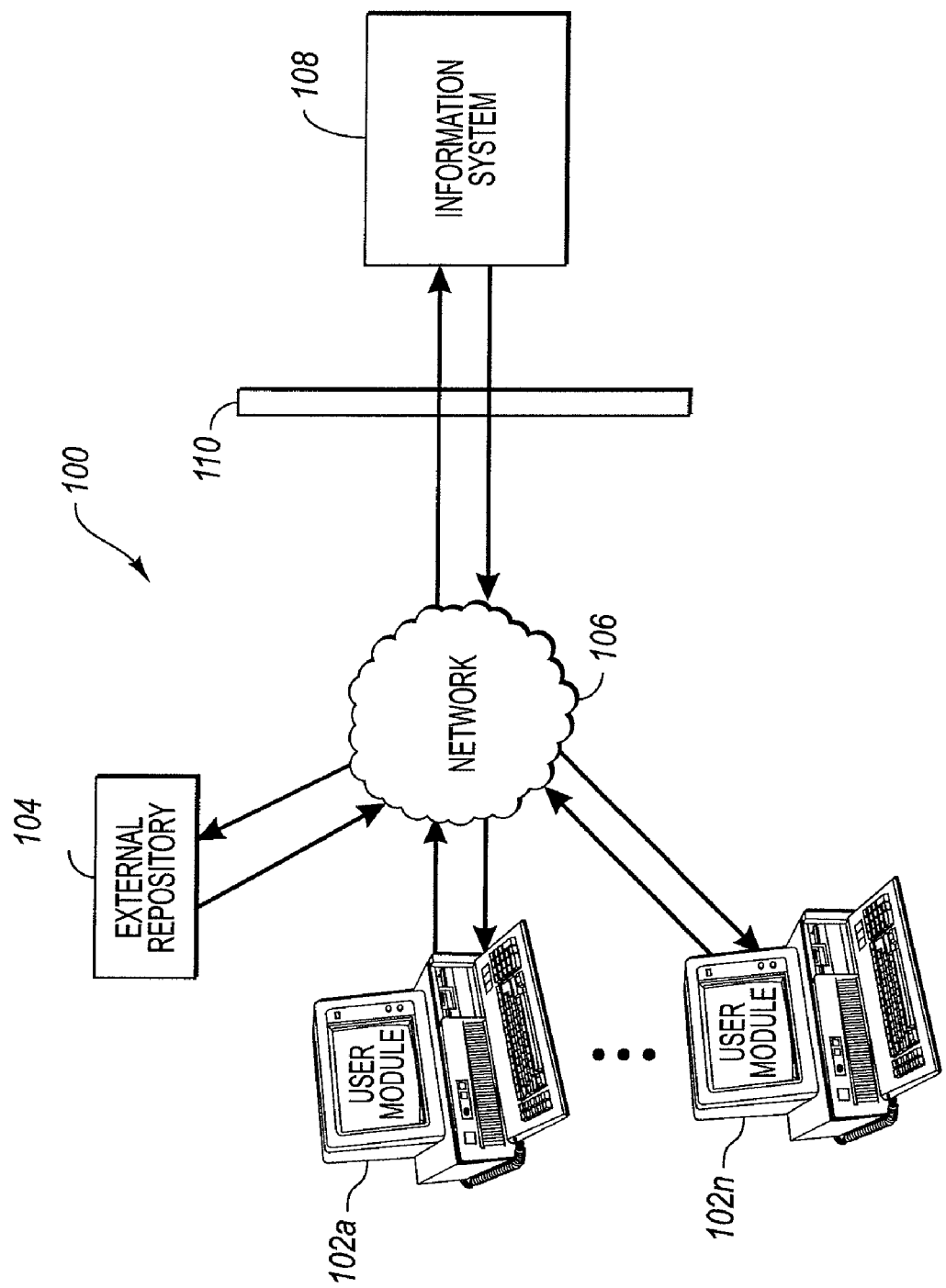
FIG. 2 is a generalized schematic representation of one illustrative system of the present invention.

Referring now to FIG. 2, depicted is a schematic representation of one illustrative system utilizing the benefits of the present invention. As shown, the system, as designated by reference numeral 100, includes one or more user modules 102a-102n that communicate with information system 108 through network 106. Optionally, an external repository 104 communicates with information system 108 through network 106.

The use of the term "communicate with" or the like terms as used herein is understood by one skilled in art to include any type of applicable connectivity or communication line connection between hardware and/or software modules and components of system 100. Such a connection or connectivity can include, but is not limited to, transmitting and receiving electrical, wireless, or data signals, physical connection between hardware modules, virtual connection between software modules, optical connection, combinations thereof, or the like.

Each user modules 102a-102n can represent an user or group of users that desire to access the resources and services associated with information system 108 through one or more hardware and/or software modules. Alternatively, each user module 102a-102n can represent solely the hardware and/or software modules utilized by one or more users to access information system 108. Consequently, each user module 102a-102n can represent a browser that facilitates communication with information system 108 and access to the web-based applications and systems accessible therein or therethrough. In one configuration, the browser can be Microsoft® Internet Explorer, Netscape® Navigator or Communicator, or other browser applications known by one skilled in the art.

Besides user modules 102a-102n, information system 108 can communicate with external repository 104. Although only a single external repository 104 is depicted, one skilled in the art can appreciate that system 100 can include multiple external repositories. External repository 104 acts as a data or information store accessible to information system 108 and/or user modules 102a-102n. The information and data stored within external repository 104 can be related or unrelated to the operation of an organization or institution that hosts information system 108.

The external repository 104 can store different types of data and information within a database, whether hierarchical, relational, flat, or other database structure, including related database management systems (not shown). Such database can include modular or fixed memory, magnetic storage disks, optical storage media, or other mass storage for storing the information and data. External repository 104 can also include on-line web-based services that are hosted at various web sites, such as, for example, Infospace® or other web sites offering services such as news and information, retail purchasing, etc.

Facilitating communication between user modules 102a-102n, external repository 104, and information system 108 is network 106. Network 106 can have many configurations, such as but not limited to a local area network (LAN) or a wide area network (WAN), no matter the particular type of topology, protocol, or architecture used to form network 106, so long as network 106 allows data transmission between user modules 102a-102n, external repository 104, and information system 108. Although FIG. 2 depicts user modules 102a-102n communicating with external repository 104 via network 106, one skilled in the art can understand that user modules 102a-102n can optionally communicate directly with external repository 104 without network 106.

To prevent unwanted access to information system 108, system 100 can optionally include a firewall 110. Firewall 110 can use various techniques to protect information system 108 and the various other modules and components on the information system side of system 100 from unwanted access by users not meeting the designated security criteria or having the correct credentials. For instance, and not by limitation, firewall 110 can use a packet filter technique, an application gateway, a circuit-level gateway, a proxy server, other hardware and/or software modules and components, combinations thereof, or the like to prevent or control unwanted access to information system 108.

In one setting, information system 108 provides services and information about a university or to students, faculty, administration, and/or alumni of a university. For instance, information system 108 can allow a user, through a user module, to access information about classes, enrollment, libraries, work opportunities, administrative applications or systems, or the like. Additionally, both students and faculty can e-mail one another, post assignments and projects, view calendared events for the institution, or the like.

Although reference is made to application of the present invention within an information system hosted by a university, one skilled in the art can understand that various other organizations or institutions can utilize the benefits of the present invention. For example, embodiments of the present invention can be used with any organization or institution that includes one or more users that can receive electronic communication, i.e. instant messages, email, announcements, or the like, and would benefit from receiving such electronic communication.

Figure 3:
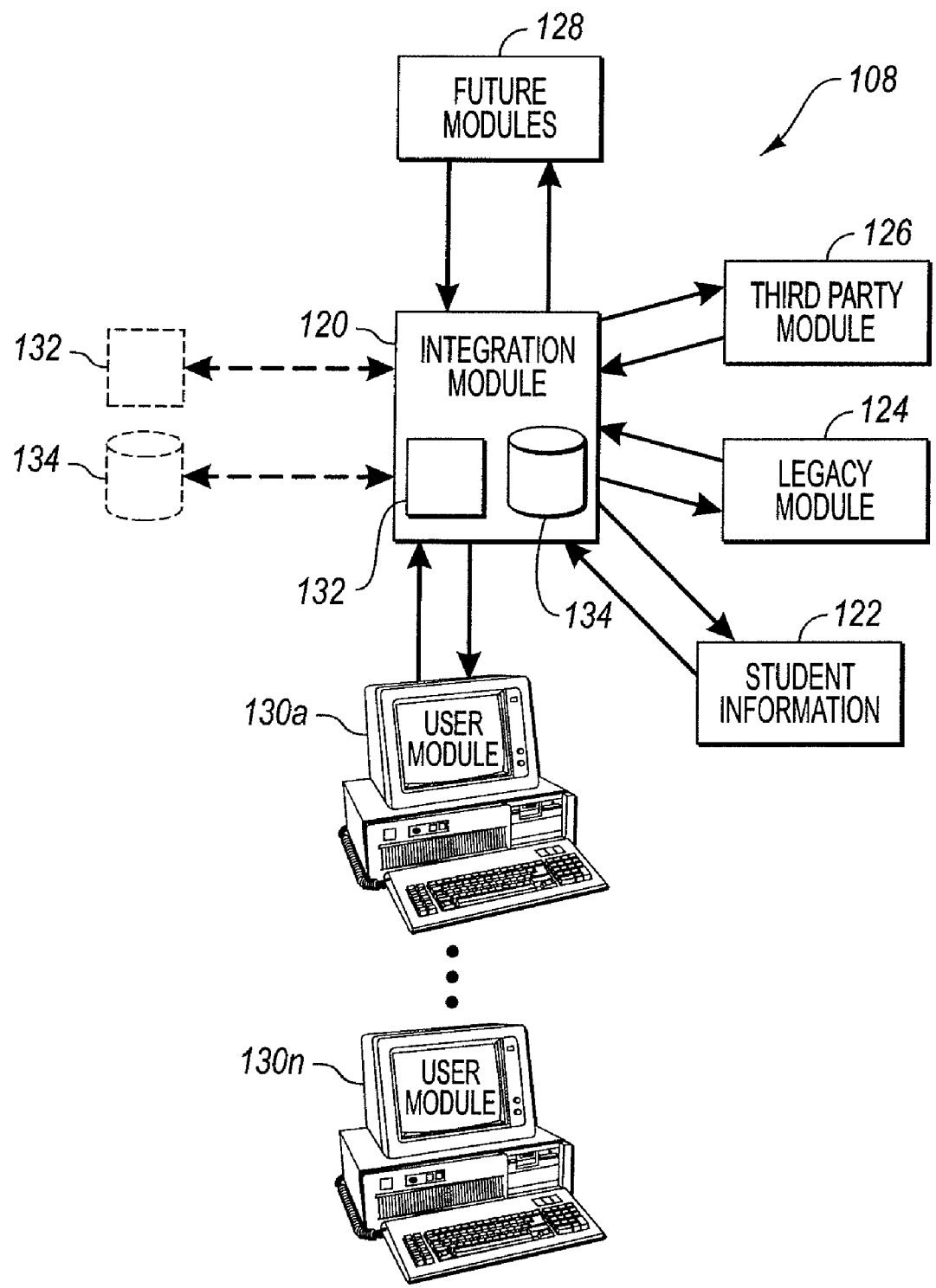
FIG. 3 is a more detailed schematic representation of one illustrative system of the present invention.

Referring now to FIG. 3, discussion will be made with respect to the functionality and capabilities of information system 108 as it relates to a university environment. Although reference is made to application of the present invention within a university, one skilled in the art can understand that various other organizations or institutions can utilize the benefits of the present invention.

As shown, information system 108 can include an integration module 120 that communicates with a student information module 122, a legacy module 124, a third party module 126, and one or more other future modules, as represented by reference numeral 128. Further, information system 108 can include user modules 130a-130n that can access integration module 120, student information module 122, legacy module 124, third party module 126, and future modules 128 without passing through firewall 110. Such user modules 130a-130n can include administrative personnel, technical personnel, IT personnel, students, faculty, or the like that access information through the university's intranet. For convenience, and not by way of limitation, user modules 102a-102n and 130a-130n will hereinafter be referred to collectively as user modules 102a-102n.

While the various embodiments of the present invention are described as utilizing a localized integration module 120 to coordinate the seamless interface, login, log-out, and timeout, it will be appreciated that other systems known in the art can be utilized in place of integration module 120 to coordinate various inventive aspects of the invention. For instance, in another configuration, a centralized host system can be used to facilitate coordinated login and logout of a user from information system 108 and various other systems or applications.

The student information module 122, legacy module 124, third party module 126, future module 128, and user modules 102a-102n act as external systems with respect to integration module 120. Consequently, each of these modules is considered as an external system and collectively as external systems. More generally, any module, system, application, or platform not included in integration module 120 can be considered as an external system.

These external systems can typically uniquely identify users of the system, allow users to access the services or products of the external system though establishing a session, can track a particular user's session, and can terminate access by the user when the user is timed-out. Additionally, the external systems can deliver to and receive information and data from integration module 120, thereby enabling integration module 120 to maintain a session with the external systems and hence maintain state. Although reference is made to certain functionality of the external systems, it can be appreciated that the external systems can have a variety of other functionality. For example, student calendar information, content management application functionality, or the like.

Integration module 120 and the external systems are web-based systems that are identified by a domain, where each web page, on-line document, or other products or services available via integration module 120 and the external systems are described by uniform resource locators (URLs). These URLs having a domain name and/or arguments that define the particular location of each portion of system 100.

Integration module 120, as the name implies, controls access to and communication between the disparate modules and systems of system 100. This can be achieved through use of a variety of different networks, such as but not limited to those types of network discussed herein with respect to network 106, whether or not such network is considered as an intranet.

In one configuration, integration module 120 acts as the hub of information system 108, optionally with all communication between user modules 102a-102n and the external systems of information system 108 passing through integration module 120. Therefore, integration module 120 can act as a portal through which user modules 102a-102n can access the web-based external systems of system 100, including those external systems remote from information system 108. Consequently, integration module 120 can be configured to communicate with each external system, i.e., deliver information or data to the external systems and receive information and data therefrom, no matter the type or configuration of the external system. Therefore, integration module 120 is configured to create a session with the external systems and maintain state, while user modules 102a-102n create a session with the external systems.

Although, in one embodiment, integration module 120 controls access to the various other external systems, one skilled in the art can appreciate that each of the external systems of system 100 can communicate one with another, without communicating through integration module 120.

In addition to the above, integration module 120 can include at least one application 132 that provides a user of integration module 120 with the functionality described herein, such as but not limited to, university services and courses, information about classes, enrollment, libraries, work opportunities, e-mail, notices, assignments and projects, or the like. Additionally, application 132 can generate and/or control an interface through which user modules 102a-102n can access the external systems of system 100 and the services provided by information system 108 and integration module 120. This application 132 provides user modules 102a-102n with a seamless navigation experience between all accessible systems, modules, and platforms of system 100, while providing various services that are useful to the users of system 100.

It can be understood that integration module 120 can include a plurality of applications, as illustrated by the dotted representation of a second application 132, whether or not they are external or remote to integration module 120 and/or information system 108. The services accessible via application 132 can include, but are not limited to, (i) security functions to protect access to sensitive information of information system 108, (ii) e-mail services for those users accessing information system 100, (iii) chat room services, (iv) message board services, (v) calendar services, or the like. These services can be integrated with the existing services provided by the other modules and systems of system 100, such as the external systems. The services can be integrated through coding changes to existing applications or by some other manner known by one skilled in the art in light of the teaching contained herein.

As described in this illustrative configuration, access to one or more of such external systems can be limited to those users having the correct credentials, such as but not limited to user identifiers and passwords. To facilitate this, integration module 120 can include a database 134 filled with user accounts and associated access information, i.e., identifiers, user names, user identifiers, passwords, other credentials, or the like. This database 134 can be populated with the access information by importing such information from other systems, applications, and platforms, such as student information module 122, legacy module 124, third party module 126, future module 128, or other external systems. Alternatively, access information can be input manually into database 134 and/or each of the applicable systems, applications, and platforms to provide consistency between the credentials or access information stored at the external systems and those stored at integration module 120.

In addition to storing user access information, each user account can store the status of the user's session on integration module 120 and the various external systems. For example, each user account can include a "last activity" attribute that defines the time or period when the user was last using the services or products related to integration module 120 or the external system. Further, each user account can include an "external session" attribute for each external system that the user can access. This external session attribute defines the session that the user is to commence upon accessing or authenticating to the external system. The external session attribute can include status information, i.e., active or inactive session, for the particular session and external system.

Alternatively, the external session attribute can include no status information, rather the inclusion of an external session attribute defines that the user has an active session upon the particular external system. Consequently, in such a case, when no external session attribute is present, the user has no active session on that particular external system. Further, in such a case, the user receives a new external session attribute each time the user creates a session on the external system.

Additionally, each user account can store the identifiers and credentials that enable the user or integration module to login to the external system. Further, each user account can include attributes or information about user's gender, class status, e.g., sophomore, junior, senior, etc., grade point average, full time, part-time, continuing education, teaching assistant, full names, email address, list of courses currently attending, roles, group memberships, courses taught, academic major and minor, data of birth, year in school, school address, home address, date of last login, or the like.

The above information, and other appropriate information known to one skilled in the art, can be stored in a database 134 included within integration module 120. Optionally, integration module 120 can include multiple databases, as illustrated in dotted lines, whether or not one or more of the databases are remote from integration module and/or information system 108.

One skilled in the art can identify various manners to obtain consistency between the various systems, applications, and platforms of system 100 and/or populate database 134 with a list of the available identifiers and credentials for each user associated with each user module 102a-102n. Database 134 also optionally includes other information useful for production of the on-line document, such as user preferences, user names, and the like.

Integration module 120 is configured to facilitate use of a web-based application and system to assist with the performance of the methods described herein. These methods enable the user to access various external systems in a seamless manner from the point of view of the user that accesses integration module 120 and its associated graphical user interface 132. Further, the methods allow integration module 120 to create a session on one or more of the external systems as a user requests access to each external system. This enables each external system, and integration module 120, to track the activities of the user associated with user modules 102a-102n and maintain state.

Integration module 120 is configured to facilitate access to various external systems. Illustratively, the external systems depicted in FIG. 3 represent systems associated with a university or other educational institution. Other organizations or businesses can have external systems associated with other departments, divisions, peer groups, management, or the like. For instance, the external systems can be department specific, such as but not limited to, human resources, accounting, finance, manufacturing, sales, marketing, research and development, or the like. The external systems can be regional specific, Asia, Europe, South America, North America, Northwest, Midwest, East, West, South, North, or the like.

As depicted in FIG. 3, one illustrative external system is student information module 122 that represents, in one configuration, one of the many administrative system databases of information system 108. The student information module 122 stores information related to students, faculty, administration, alumni, or the like in a data store, such as one or more relational, hierarchical, flat or the like databases with associated database management systems, whether such databases are incorporated within one or more networked or standalone computers, such as computer 20.

The information stored within student information module 122 can include, but is not limited to, student names, addresses, social security numbers, e-mail addresses, grades, classes completed or enrolled in, class schedules, faculty information, administration information, or the like. Although discussion is made herein to the above-recited information, one skilled in the art can appreciate that other information can be stored and accessed by integration module 120 and other modules described herein; based upon the particular application of system 100.

Another module optionally forming part of information system 108 is legacy module 124. The legacy module 124 includes, for example, existing mainframe, network, or personal computer systems on which the university or college executes software or maintains a database for conducting school business. Legacy module 124 represents various applications and systems that a university or similar institution would currently have installed before incorporating integration module 120 within information system 108. These applications and systems often include, but are not limited to existing administration, finance, and enrollment systems and contain information such as course listings, course description, registration, grades, student information, student finances, student housing information, and the like. The integration module 120 and the methods and systems described herein are configured to interface with legacy module 124 and control access to such existing systems and applications.

As the names suggest, third party module 126 and future modules 128 represent additional systems and modules that can be added to information system 108 at later dates, based upon the implementation of the various portions of information system 108. These systems can include numerous backup data storage repositories, research databases, libraries, or the like.

Figure 4:
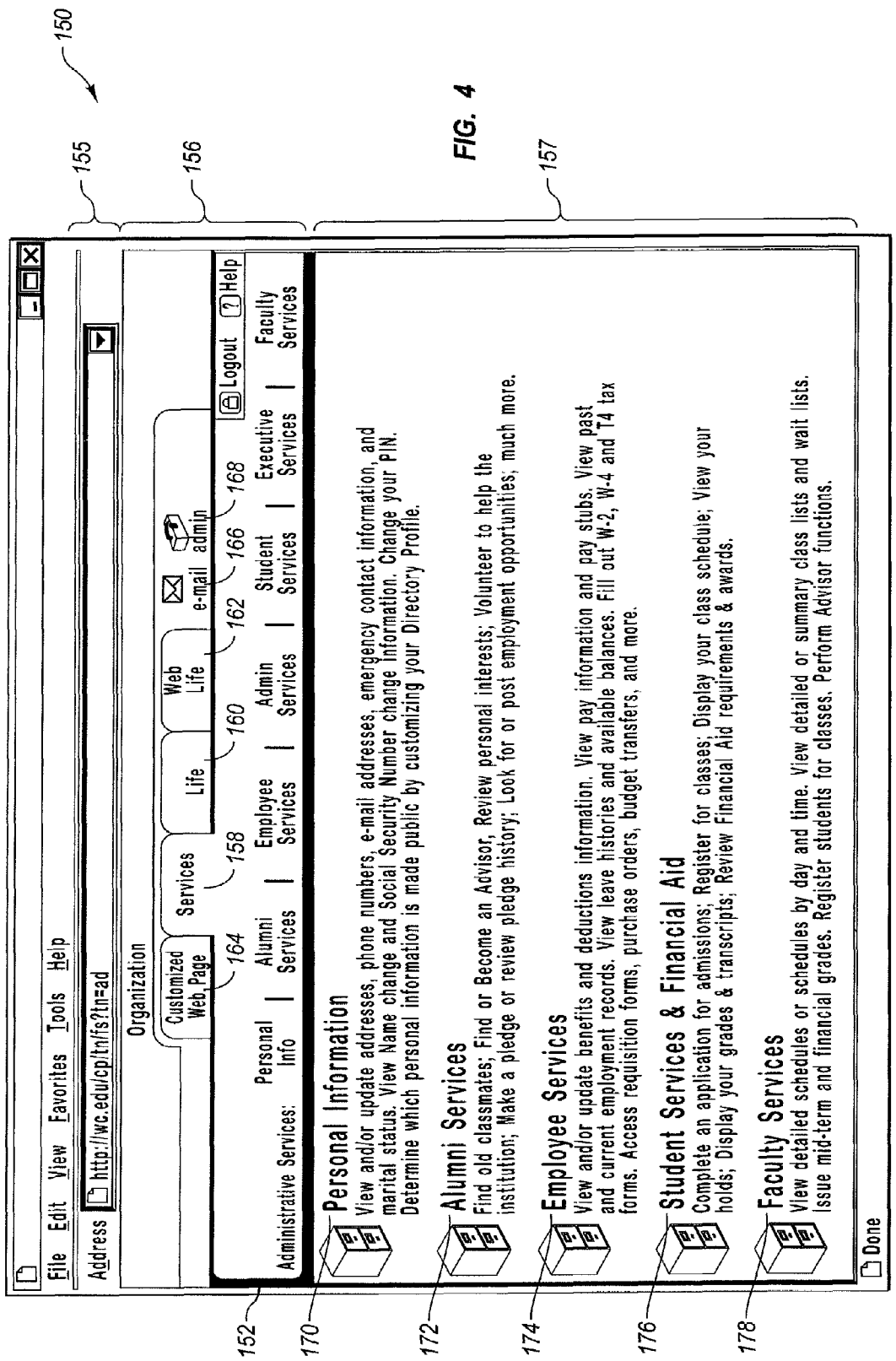
FIG. 4 is an illustration of a graphical user interface according to the present invention.

Referring now to FIG. 4, embodiments of the present invention provide methods and systems for providing a user with a seamless user experience as the user accesses multiple, separate web-based systems. Depicted in FIG. 4 is one exemplary graphical user interface, designated by reference numeral 150, through which the seamless user experience can be provided. The graphical user interface 150 is depicted as a web page 152 displayable by a conventional browser, such as those browsers described earlier and those others known to one skilled in the art in light of the teaching contained herein.

The interface 150 includes browser toolbar 155, information system header 156, and external system web page 157. The toolbar 155 provides various typical "tools" and functions to a user utilizing information system 108. For example, browser toolbar 155 can provide the functions and tools provided by Microsoft® Internet Explorer, Netscape® Navigator or Communicator, or other browser applications known by one skilled in the art.

Information system header 156 defines the different accessible portions of information system 108 and acts as an interface to various other web pages associated within information system 108. As depicted, header 156 uses a "tab" type interface where selecting a tab enables a user to navigate from web page to web page for the selected information. Although this is one embodiment, header 156 can use various other navigating methods as known to those skilled in the art. For example, header 156 can use drop-down menus, hypertext links, or the like. Although this is one embodiment, header 408 can use various other navigating methods as known to those skilled in the art. For example, header 408 can use drop-down menus, hypertext links, area maps, WML cards, JavaScript hierarchical menus, or the like.

Header 156 includes a customized web page tab 164, which links to a user's customized web page that provides a user accessing information system 108 with information and services typically utilized by the user, such as personalized announcements, calendar, news, or the like. In addition, header 156, in this illustrative embodiment, includes a services tab 158 that enables an user to review course schedules, e-mail faculty, use message boards or chat with students and faculty, check grades, visit career and research resources, or the like.

Additionally, header 156 includes a life tab 160 that provides an user with weather information, club listing, other organization listings, upcoming event information, access to a user modifiable web page listing the above, or the like. Further, header 156 includes a web life tab 162 that provides short cuts or hypertext links to music, videos, online stores, online media and entertainment, or the like available on the World Wide Web. In addition to the above, header 156 can include icons 166 and 168 that provide links to an email system and administrative systems or web sites, respectively.

As shown in FIG. 4, services tab 158 is selected, thereby accessing a particular external system web page 157 that displays a variety of available services. This web page provides a further directory of links to various administrative services that provides access to specific web sites associated with the organization, such as personal information 170, alumni services 172, employee services 174, student services and financial aid 176, and faculty services 178.

By providing header 156, the system provides a seamless user interface as the user module navigates through various external systems, such as those depicted in FIG. 4. Preferably, the external systems can be designed to match the overall style and appearance of header 156, thereby enhancing the seamless experience.

Graphical user interface 150 further provides an interface through which users can access the external systems of system 100 and the services provided by information system 108 and integration module 120. This graphical user interface provides each user with a seamless navigation experience between the accessible systems, modules, and platforms of system 100, while providing various services that are useful to the users of system 100, such as but not limited to, those described with respect to tabs 158, 160, 162, and 164 and icons 166 and 168.

Creation of a seamless user experience utilizes an always-present user interface to select application functionality and coordinate any changes to the user interface. In FIG. 4, the always-present user interface is graphically depicted as header 156. Accordingly, integration module 120 preferably contains means for generating a user interface. The integration module 120 can also contain the Hypertext Markup Language (HTML) necessary to generate header 156. Although reference is made to HTML, it can be understood that integration module 120 can contain data or instructions to generate header 156, and more generally interface 150, in a variety of other languages. For example, integration module 120 can use Extensible Markup Language (XML), Extensible Hypertext Markup Language (XHTML), Wireless Markup Language (WML), or the like.

As discussed above, one aspect of the present invention is a coordinated login to the various external systems. The integration module 120 facilitates "single sign-on" of a user through user modules 102a-102n to integration module 120 and one or more of the external system. Accordingly, integration module 120 controls the manner by which a user can login to the different external systems, while controlling the manner by which these users can log-out of the external systems. Integration module 120 enables the user to login once to information system 108 and subsequently optionally dynamically and/or automatically "logging in" the user to each external system as the user selects to access each external system. In this manner, integration module 120 integrates the various external systems associated with system 100 and creates a seamless interface for a user that accesses integration module 120 and the external systems through one or more of user modules 102a-102n.

By allowing "single sign-on," integration module 120 substantially eliminates the need for each user to remember every user identifier and credential and use such identifier and credentials each time the user wishes to access each external system through user modules 102a-102n. In addition, integration module 120 is configured to create a user session on each external system as each particular user access the external system through user module 102a-102n. Consequently, by enabling a user to create an active session, or user session, on the external systems, the external systems are able to track the activities of the users and user modules 102a-102n as they access each external system, thereby maintaining state.

As mentioned above, information system 108 can use an architecture where integration module 120 and the external systems are accessible through a web-based interface, i.e., browser, and defined by URLs and arguments. The integration module 120 of the present invention is configured to create a session on each external system as each user selects to access those external systems through user modules 102a-102n. Integration module 120 can track the activities of those users, through user modules 102a-102n, which login to integration module 120. Consequently, integration module 120 can maintain state.

By creating user sessions on each external system, integration module 120 enables each respective external system to track the activities of each user and/or user module 102a-102n with a current session on the particular external system and maintain state for each user and user module 102a-102n.

Stated another way, integration module 120 maintains state as each user, through user module 102*a*-102*n*, is "logged in" to and "logged out" of integration module 120, Further, integration module 120 aids with creating the connections and sessions for the user on the external systems that enable each external system to maintain state. One skilled in the art can identify various other methods and manners by which integration module 120 can enable the external systems to maintain state as each user, through associated user module 102*a*-102*n*, is granted access to such external systems through integration module 120. These methods and manners further enable integration module 120 to integrate the various external systems of system 100 and create a substantially seamless experience for the user as he/she accesses the same through an associated user module 102*a*-102*n*.

Figure 5:
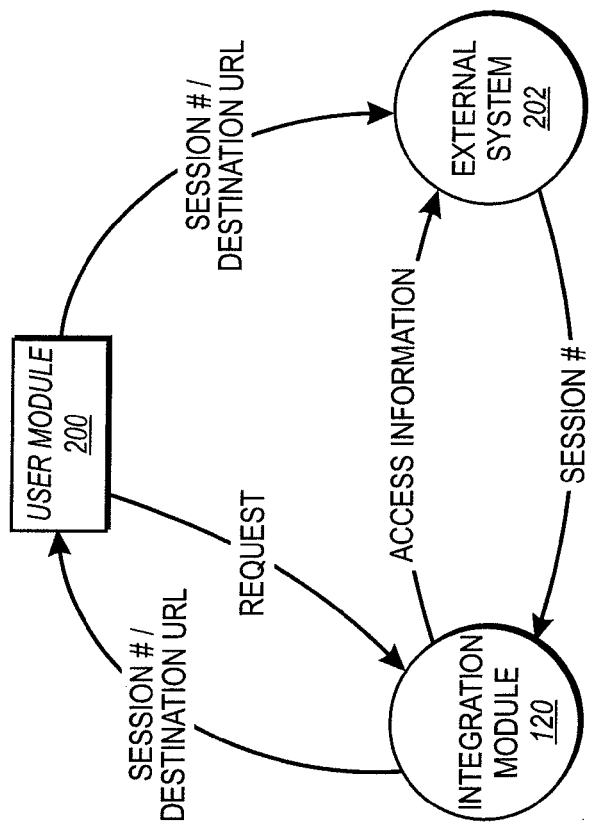
FIG. 5 is a detailed schematic representation of the interaction between selected modules of the system illustrated in FIGS. 2-3 as the authentication process utilizes a URL rewriting technique.

Referring now to FIG. 5, illustrated is a schematic representation of the interaction between user module 200, integration module 120, and external system 202. This illustrative schematic is for the case where external system 202 utilizes URL rewriting to establish a session, authenticate user module 200, and grant user module 200 the right to access various portions of external system 202, and maintain session state while user module 200 is "logged in" to external system 202.

Although a single user module 200 is illustrated, one skilled in the art can appreciate that a similar discussion can be made for multiple user modules, as well as for multiple integration modules 120 and multiple external systems 202. The user module 200 represents a user that is to access integration module 120 and external system 200 using hardware and/or software modules, i.e., a browser installed on a computer. Alternatively, user module 200 can represent solely the hardware and/or software modules through which a user can access integration module 120 and external system 200. Consequently, user module 200 can be similar or dissimilar from user modules 102*a*-102*n* and 130*a*-130*n*.

In general terms, URL rewriting entails writing a session identifier within the URL of the web page or address requested by user module 200 and displayed through user module 200 as user module 200 accesses the web page or address. Different session identifiers can designate different access rights for different user modules, i.e. different users that access the external system or other sub-system of information system 108. Consequently, as a user accesses external system 202 through user module 200 and integration module 120, the URL sending user module 200 to the particular destination requested by the user through user module 200 includes a session identifier that authenticates user module 200 as having rights to access such a portion of external system 202.

In this illustrative configuration, an user utilizing a browser associated with user module 200 logs-in to integration module 120 and information system 108 (FIG. 2) through typical login procedures, such as but not limited to inputting a user name and password, other credentials, or the like. One skilled in the art can identify various other login procedures that could be used to facilitate user module 200 accessing integration modules 120. For example, challenge/response authentication, X.509 certificates, or the like.

When the user has logged-in to integration module 120, the user through user module 200 and its associated browser, can request access to external system 202. This request is sent to integration module 120 upon the user, through user module 200 and graphical user interface associated with integration module 120, selecting a link to a particular external system, such as external system 202. Although it is preferable that links are used to navigate about information system 108 and system 100, one skilled in the art can identify various other manners by which a user can select to access an external system. For instance, a user can select an entry from a drop down menu, check a box associated with a description of the external system, or the like.

No matter the manner by which a request is made, such a request can take the form of a URL defining the particular external system to which the user and consequently user module 200 desires access and a destination URL defining the particular web page of external system 202 to be displayed to user through user module 200. Following receipt of the request, integration module 120 can forward access information or credentials to external system 202. Once external system 202 authenticates the access information, external system 202 can forward a session identifier to integration module 120. This session identifier defines the access rights granted to the user and user module 200 for external system 202. Following receipt of the session identifier, integration module 120 stores the session identifier so that integration module 120 can track which external systems user module 200 has accessed, and thereby maintain state.

Subsequent to receiving the session identifier, integration module 120 can combine the session identifier with the destination URL, deliver the session identifier and the destination URL to user module 200, and redirect user module 200 to the destination URL of external system 202. Therefore, a session for the user and user module 200 is created on external system 202 and external system 202 can track the activities of the user and user module 200 independently from integration module 120. Consequently, external system 202 can maintain state.

Figure 6:
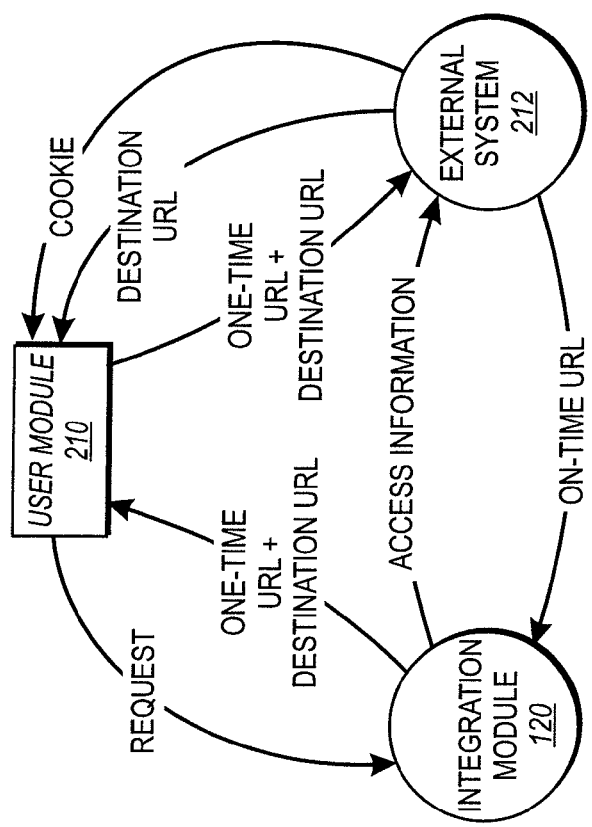
FIG. 6 is another detailed schematic representation of the interaction between selected modules of the system illustrated in FIG. 2-3 as the authentication process uses cookies.

Referring now to FIG. 6, depicted is a schematic representation of the interaction between user module 210, integration module 120, and external system 212 for the case where external system 212 utilizes a cookie to establish a session with external system 212 and enable external system 212 to maintain state through creating the session.

Upon a user utilizing user module 210 to login to integration module 210, user module 210 can request access to external system 212. Such a request can take the form of a URL defining the particular external system to be accessed and the destination URL within the external system to be displayed at user module 210.

Following receipt of the request, integration module 120 can deliver access information or credentials to external system 212. Once external system 212 authenticates the access information, external system 212 can forward a one-time usage URL that defines a particular URL location of external system 212 where user module 210 can complete the authentication process and establish a session on external system 212. Optionally, external system 212 can pass a session identifier with the one-time usage URL, when external system uses both URL rewriting and cookies to authenticate the user and user module 210 and establish a session that allows external system 212 to maintain state.

Following receipt of the one-time URL and/or the session identifier, integration module 120 can add the destination URL received from user module 210 as an argument to the one-time use URL and forward this combined URL to user module 210. Subsequently, integration module 120 can redirect user module 210 to the one-time use URL associated with external system 212.

When external system 212 receives the request from user module 210 for the one-time use URL, external system 212 can write out a cookie to the computer associated with user module 210. In this manner, the computer and user module 210 receives a cookie from external system 212, which is the only system authorized to write out a cookie from the external system's 212 domain.

In addition to writing out a cookie, external system 212 can retrieve the destination URL and redirect user module 210 to the destination URL without the user using user module 210 knowing of the various activities and actions taken following the user selecting a particular link through graphical user interface 132 displayed to the user via a browser. In this manner, user module 210 has accessed external system 212 without entering additional access information specific to external system 212, i.e., integration module 120 has facilitated a single sign-on process.

Figure 7:
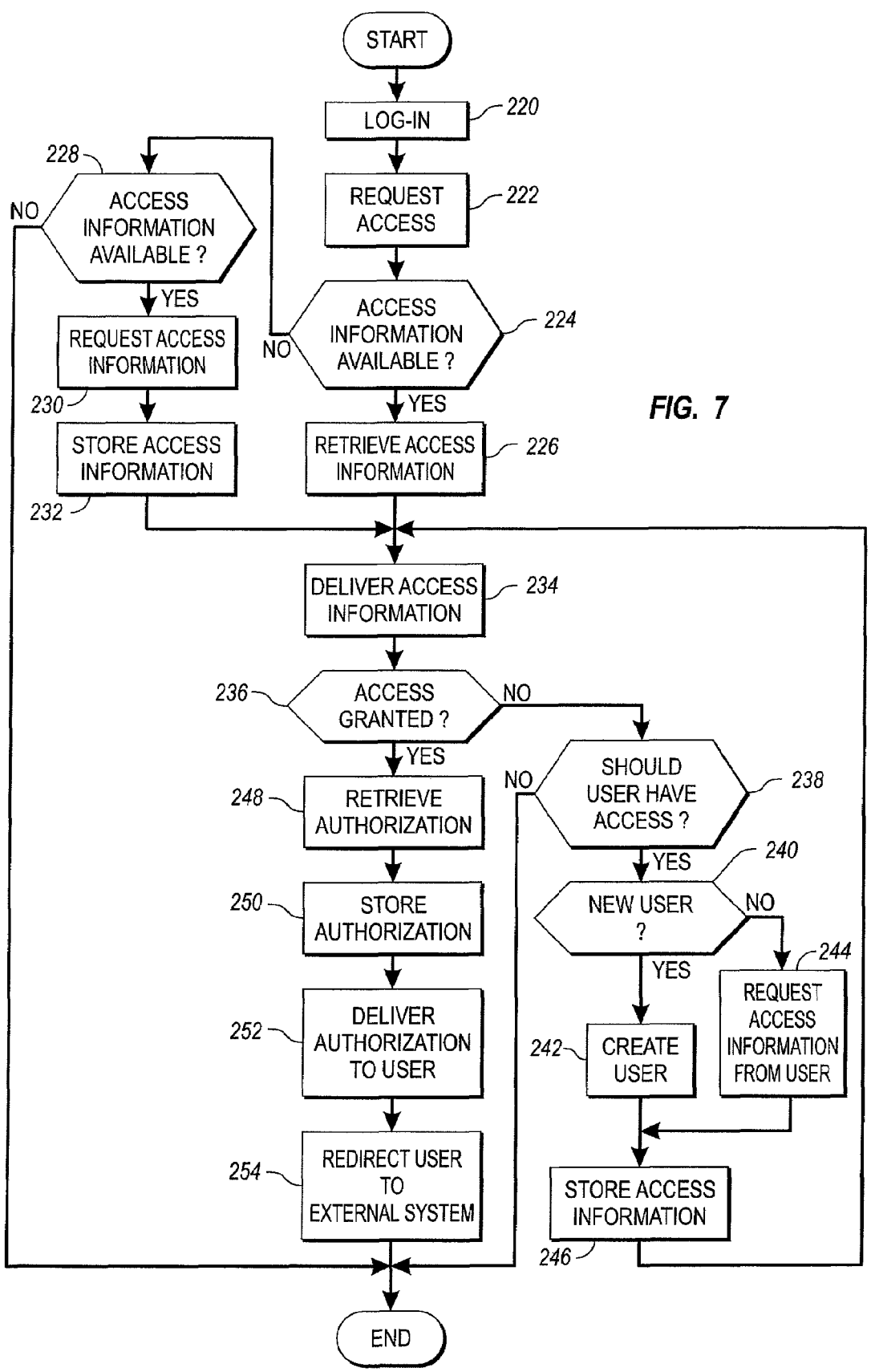
FIG. 7 is a flow diagram representing an illustrative flow of data through the system illustrated in FIGS. 2-3.

Referring now to FIG. 7, a flow diagram describing an illustrative flow of information and data between integration module 120, user module 200, 210 and external systems 202, 212 is depicted. Although discussion will be directed to user module 200 and external system 202, it will be appreciated that a similar discussion can be made for user module 210 and external system 212.

Initially a user logs-in to integration module 120 through user module 200, as represented by block 220. Upon receiving the credentials, integration module 120 can verify that the user has the right to access integration module 120. In the event that the user does not input the correct credentials or the user does not have any credentials, integration module 120 can deny access to the services and/or products associated with integration module 120 and system 100. Otherwise, the user can access the services and/or products related to system 100 through user module 200.

In some circumstance the user may desire to access external system 202, such as by selecting a link included on the user interface associated with integration module 120, as represented by block 222. Associated with the link for the particular external system 202 is a destination URL as an argument to the URL definition of the particular external system 202. Optionally, the destination URL can include a session placeholder that defines the position within the destination URL where a session identifier received from external system 202 can be placed. For example, the link could have a form of cp/ip/login?sys=library&url=library/sessionplaceholder/science, where "cp/ip/login" is the URL where user module 200 is to login to a library system and "library/sessionplaceholder/science" is the destination URL defining the web page or address within the library system to be displayed to user module 200 upon user module 200 accessing the library system. The session placeholder can be any string of characters, such as numbers, letters, symbols, combination thereof, or the like.

Upon the user selecting a particular link through user module 200, integration module 120 checks the stored credentials and access information of the user to identify the availability of access information for the specific user for the particular external system 202, as represented by decision block 224. In the event that access information is available, integration module 120 retrieves the access information for the specific user and the specific external system 202, as represented by block 226. When the same access information allows a user access to multiple external systems 202, integration module 120 need only retrieve the stored access information and not search for specific access information for specific external systems 202.

When no access information is available, in one configuration, integration module 120 verifies that the user typically is allowed to access external system 202, as represented by decision block 228. For instance, some users may be limited in their rights to access certain functionality or portions of information system 108 or system 100 and may be denied access to external system 202, such as when decision block 228 is in the negative. When the user is denied access to the selected external system 202, integration module 120 can return an access denied notice to the user through graphical user interface 132.

In the alternative, when the user should be granted access to external system 202, but no access information is available, integration module 120 can prompt the user to provide or input access information for the selected external system 202, as represented by block 230. This can be achieved by displaying a pop-up window through user module 200 that contains one or more fields that the user can fill with appropriate credentials and other information. This pop-up window is optionally a one-time window. Additionally, integration module 120 can provide a summary or other information about external system 202, user module 200 or the user, through the pop-up window. Such information can include the name of external system 202, accessible content of external system 202, or the like. By analyzing the request received from user module 200 to identify the particular external system 202 that the user is attempting to access, integration module 120 can display such summary information or other appropriate information.

When the user has completed inputting the credentials or other information into the pop-up window, integration module 120 closes the pop-up window and subsequently stores the access information in database 134 (FIG. 3) for future retrieval, as represented by block 232.

Following storage and retrieval of the access information, integration module 120 delivers the access information to external system 202, as represented by block 234. This access information may vary depending upon the particular type of external system 202 and interface used by external system 202 to communicate with integration module 120. For instance, some external systems 132 receive a user ID as the credential, while other external systems 132 receive both user ID's and password as the credential. Other embodiments may user different combinations of identifiers, passwords, or the like as credentials.

In this illustrative configuration, external system 202 can include a defined URL to which integration module 120 delivers the access information. The particular form of the URL can vary based upon the particular configuration of external system 202, so long as external system 202 includes a particular URL to which integration module 120 can send a request to access or login to external system 202. Each external system 202 can have other types of functionally specific URLs to facilitate communication between integration module 120 and external system 202. For instance, when integration module 120 is configured to track whether the user is actively using external system 202, external system 202 can include a "Last Activity URL" to which integration module 120 can "call" or request to receive a status report for the user's activity upon external system 202. Similarly, external system 202 can include a "log-out URL" to which integration module 120 sends a request to log-out the user and user module 200. External systems 132 can include other functionally specific URLs, as know to one skilled in the art, in light of the teaching contained herein.

Upon receiving the credential, external system 202 can compare the delivered access information against the stored information within external system 202. In some circumstances, external system 202 can request additional information about user module 200 or the specific user utilizing user module 200, such as through a challenge/response authentication process that verifies the credentials are being correct.

One skilled in the art can identify various other manners or methods to authenticate the request to access external system 202 in light of the teaching contained herein.

Based upon the above analysis, external system 202 can grant or deny access to the resources, services, and/or products associated with external system 202, as represented by decision block 236. When access is denied, such as when decision block 236 is in the negative, integration module 120 can determine whether the user and/or user module 200 should have access to external system 202, as represented by decision block 238. In the event that the user and/or user module 200 should not have access, the user and/or user module 200 is denied access to external system 202. In contrast, when the user and/or user module 200 should have access to external system 202, but is denied access for some reason, integration module 120 determines if the user and/or user module 200 is a new user of information system 108 is using user module 200 to access integration module 200, as represented by decision block 240.

One case where the user is denied access and decision block is the negative occurs when the user has previously circumvented integration module 120 using user module 200 to directly access external system 202. Since integration module 120 creates an interface with external system 202 and does not eliminate the front-end of external system 202, that the user can optionally circumvent integration module 120, in some cases, to create a session and access external system 202. The user through user module 200 can employ the resources, services, and/or products associated with external system 202, including changing those credentials used by the user to access external system 202. In this manner, the user may modify their access information and credentials while being disconnected from integration module 120.

Consequently, these changes may not be incorporated within database 134 (FIG. 3) of integration module 120. Therefore, when the user logs-in to integration module 120 through user module 200 and attempts to access external system 202 through integration module 120, since the user has modified their credentials, integration module 120 may deliver inaccurate credentials to external system 202, resulting in external system 202 denying access to its resources, services, and/or products.

To enable integration module 120 to facilitate the user's access to external system 202, integration module 120 can be configured to request and store corrected or new access information, as represented by blocks 244 and 246, such as through displaying a pop-up window and requesting the user to input the correct information and credentials, as described herein.

In the case where the user should be given access based upon account information stored within database 134, i.e., a new user to information system 108, integration module 120, alone or in combination with external system 202 creates new access information, as represented by block 242. Optionally, integration module 120 or external system 202 can request information from the user through module 200. Following creation of the new user access information, integration module 120 stores the information, as represented by block 246.

Upon storage of the new or updated access information, integration module 120 can deliver the access information to external system 202, which analyzes the access information and grants or denies access thereto, as represented by decision block 236. Although in one embodiment integration module 120 resends the access information to external system 202, one skilled in the art can understand that these steps can be circumvented by external system 202 delivering the authorization information to integration module 120 upon completing the access information updating or creating process.

No matter the particular manner by which authorization is granted, integration module 120 can receive authorization information, as represented by block 248. Depending upon the particular configuration of the present invention, different authorization information can be delivered to integration module 120 from external system 202. For example, where external system 202 maintains state through URL rewriting, external system 202 can send a session identifier to integration module 132, while if external system 202 maintains state through cookies, external system can send a one-time use URL to enable delivery of a cookie to user module 200, as described herein. In other configurations, both the one-time use URL and the session identifier can be sent to integration module 120.

Following receipt of the authorization information, whether session identifiers, one-time use URLs, combination thereof, or the like, integration module 120 stores the authorization information for future access, as represented by block 250. In this manner, when the user, through user module 200, desires to access external system 202 after the user voluntarily logs-out or is involuntarily logged-out from external system 202, integration module 120 can use the authorization information to redirect user module 200 to the appropriate URL in accordance with the authorization information. It can be understood by one skilled in the art that some external systems 132 may include time dependent authorization information, that may result in integration module 120 requesting new authorization information each time the user module 200 requests access to external system 202.

Upon receiving the authorization information, integration module 120 can send the authorization information to user module 200, as represented by block 252. Depending upon the particular authentication method and/or the manner by which state is maintained by external system 202, the authorization information can be combined with the destination URL, such as including the destination URL as an argument to the URL description of external system 202. Consequently, user module 200 is redirected to the selected URL and associated web page or address of external system 202, in the case of URL rewriting, or redirected to the one-time use URL, resulting in external system 202 delivering the cookie to user module 200 and redirecting user module 200 to the destination URL, as represented by block 254. In this manner, integration module 120 creates a session on external system 202 and enables external system 202 to maintain state, whether by URL rewriting, cookies, or by some other manner known by one skilled in the art.

Although reference is made herein to use of the methods and systems to login a user to web-based applications and systems, one skilled in the art can appreciate that a similar process can be used to log-out the user and associated user module from various web-based applications and systems.

Generally, integration module 120 controls the manner by which a user through user module 200 logs-in to and logs-out of external systems 200. For instance, when an user through user module 200 voluntarily logs-out of information system 108, integration module 120 can request each external system 202, to which the user has an active session, such as through the functionally specific URLs described herein to, that these external systems terminate the session or log-out the user. Alternatively, integration module 120 can perform a similar process when the user and/or user module 200 is involuntarily logged-out of information system 108, such as when the user and/or user module 200 is no longer actively using the resources of information system 108 or the external systems 200.

Although integration module 120 facilitates integration and communication between user module 200 and external systems 202, each external system 202 can operate independently from integration module 120 and may maintain state independently from integration module 120. Consequently, with regard to "logging out" the user and/or user module 200, each external system 202 can selectively log-out the user and/or user module 200 based upon criteria or controls specific to the particular external system 202. Therefore, the web-based applications and systems associated with information system 108, and more specifically integration module 120 and the methods and systems associated therewith, facilitate access to various disparate systems and modules of systems 100, while enabling external systems to maintain state according to the particular methods and manners associated with each particular external system.

Figure 8:
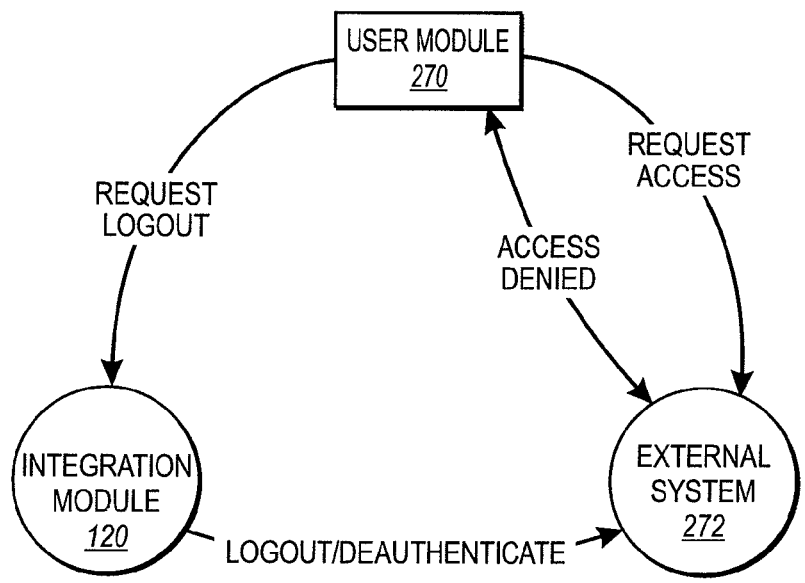
FIG. 8 is another more detailed schematic representation of the interaction between selected modules when a user logs-out of the information system of the system illustrated in FIGS. 2-3.

Referring now to FIG. 8, depicted is a schematic representation of the interaction between a user module 270, integration module 120, and an external system 272 for the case where a user and/or user module 270 initiates a log-out from integration module 120. The integration module 120 coordinates the log-out sequence for each external system 272 to which the user and/or user module 270 has been authenticated.

The descriptions related to user modules 102*a*-102*n*, 130*a*-130*n*, 200, and 210 apply to user module 270. Similarly, the descriptions related to external system 132, 202, and 212 apply to external system 272.

The coordinated log-out or de-authentication of the user utilizing user module 270 is achieved by maintaining status information for each known external system for each user that has created a user session in the integration module. This status information is stored within integration module 120, either in a centralized data store of status information or within respective user accounts of those users that have accessed or created an active session upon one or more of the external systems.

The status information defines whether the user is "logged in" to an external system and to which external system. The status information, in one embodiment, is a list of the external systems that each specific user can login to and one or more attributes that define whether the user is active or inactive on such an external system. For example, the status information can be associated with the external session attribute stored within the user's account within the information.

In another configuration, the status information can take the form of a status attribute that includes multiple other attributes storing external system identifiers for those external systems upon which the user is active. One skilled in the art can identify a variety of different manners for defining and storing the status information.

A user can select to log-out of integration module 120 at any time. Upon the user selecting to log-out, in one embodiment, the graphical user interface displays a terminating dialog menu that enables the user to confirm that the user wishes to terminate a session on integration module 120. Various other manners are known to one skilled in the art to enable the user to terminate a session on integration module 120. For example, the user can select a log-out, exit, terminate, or the like selection from a drop down menu, the tool bar, or the like to terminate the session. In other configurations, the graphical user interface displays a log-out, exit, terminate, or the like selectable button that can be selected or clicked by the user to terminate the session. Other manners are known to those skilled in the art.

Upon a request from the user, through user module 270, to log-out or de-authenticate from integration module 120, integration module 120 iterates over a list of known external systems 272. For each external system 272 that has an active user session for that user module 270, integration module 120 invokes the log-out or de-authenticate URL on behalf of the user to log-out the user from external system 272. Once the user is logged out of all external systems 272, the user is "logged out" or de-authenticated from integration module 120. After the user, through user module 270, requests a log-out from integration module 120, and integration module 120 logs-out the user from external system 270, any attempt thereafter by the user to access external system 272 results in an access denied message being transmitted to user module 270.

In one embodiment, log-out from each external system 272 is effected though a de-authenticate user URL of the external system. The integration module 120 delivers to such a URL parameters that specifies the user and/or user module 270 that is to be logged out. When the user and/or user module 270 is logged out, all server-side resources at external system 272 are freed.

Due to the flexibility of the "single-sign on" model, there is a matching flexibility in the log-out operation. For example, in the event that an external session attribute has been stored within the user's account within integration module 120, that external session attribute is substituted for the placeholder pattern in the log-out URL invocation. In the event that no external session attribute has been stored in the user's account, then the de-authenticate user URL invocation can include the specific user credentials for that external system in order to allow the external system to have the information needed to log-out the user.

Those skilled in the art will realize that there will be cases where the external session attribute will remain in the browser or integration module 120 even though the user has log-out of integration module 120. This case can be handled in the same way as when the user is timed-out from an external system, described hereinafter.

Figure 9:
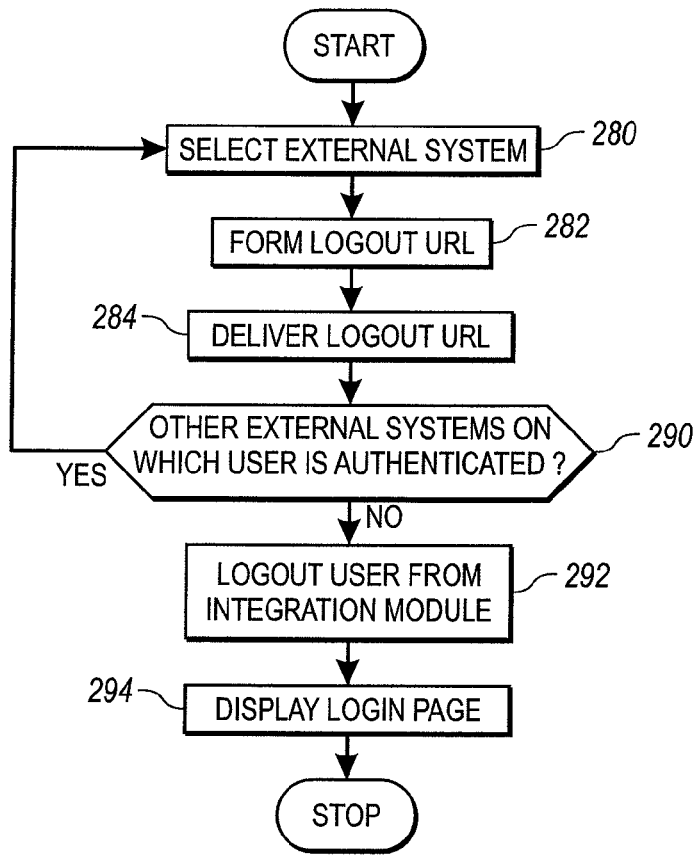
FIG. 9 is another flow diagram representing an illustrative flow of data through the system of the present invention upon the occurrence of the user logging out of the information system as illustrated in FIG. 8.

Referring now to FIG. 9, depicted is a flow diagram describing a coordinated log-out procedure implemented between integration module 120, user module 270, and external system 272. In this embodiment, integration module 120 forces a log-out from one or more external systems 272 after a user session on integration module 120 is terminated, i.e., the user logs-out.

As illustrated, the method includes selecting a first external system under which the user and/or user module 270 has been authenticated, as represented by block 280. For that external system, integration module 120 forms a deauthenticate user URL, as described hereinabove and represented by block 282. The integration module 120 then delivers the deauthenticate user URL to external system 272, as represented by block 284. After external system 272 receives the de-authenticate user URL, external system 272 logs-out the user and/or user module 270. This enables external system 272 to free server-side resources.

In addition to delivering a log-out URL to the first external system 272, integration module 120 verifies whether the user and/or user module 270 has been authenticated in other external systems, as represented by block 290. If so, such external systems are logged-out of as described herein.

After the user and/or user module 270 is logged-out of the external system 272, user module 270 and the associated user are logged-out of integration module 120, as represented by block 292. Finally, integration module 120 displays the login page upon the browser associated with user module 270, as represented by block 294.

Figure 10:
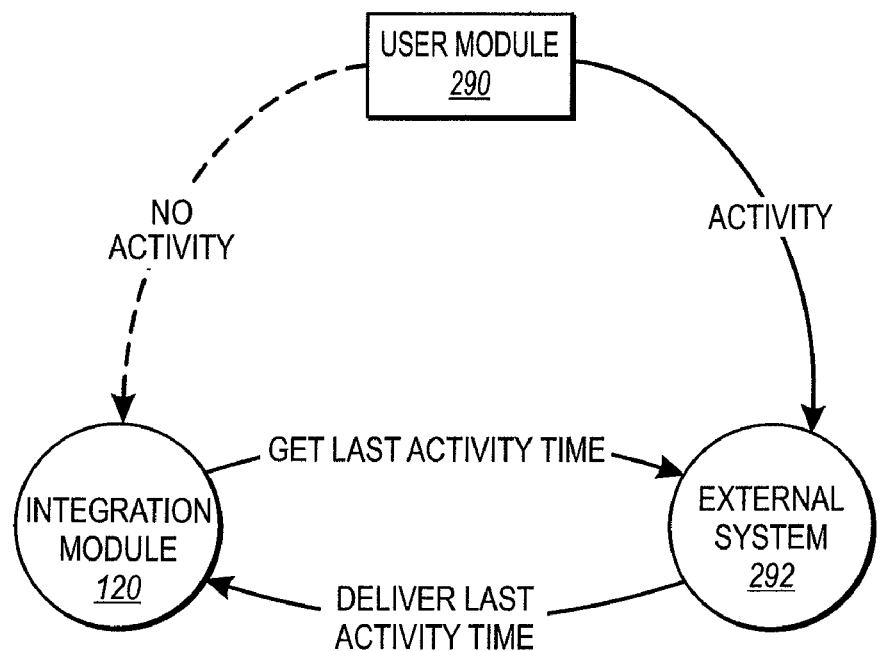
FIG. 10 is yet another more detailed schematic representation of the interaction of selected modules when the user is timed-out from his/her access to the integration module of the system illustrated in FIGS. 2-3.

Referring now to FIG. 10, depicted is a schematic representation of the interaction between user module 290, integration module 120, and external system 292 for the case where the user is timed-out from integration module 120 for inactivity. The majority of the features and functions discussed with other embodiments of user modules and external systems apply to user module 290 and external system 292 respectively.

In the event that the user utilizing user module 290 is inactive for longer than a time-out period defined by an administrator of integration module 120, integration module 120 will commence a log-out procedure to de-authenticate the user and associated user module 290 from the entire information system 108 depicted in FIG. 2. This time-out period can be defined by the administrator of information system 108 and be referenced by the number of seconds, minutes, hours, etc. that the user can wait between performing actions upon the information system and/or the external systems. Alternatively, and more typically, the administrators of each external system and module of the information module separately define the time-out period.

However, before integration module terminates the user's session, integration module 120 checks all external systems 292 that the user has accessed to identify whether the user is active in one or more of the external system. In the event that the user is still active in any external system 292, then the log-out procedure is aborted.

Similar to the checks made during a coordinated log-out operation, integration module 120 iterates over the known set of external systems 292, checking each for the status of the user, i.e., identify whether the user has an active session upon one or more of external systems 292. For each system that is identified as having an active session, i.e., is logged into external system 292 and performing some action within a period defined by external system 292, integration module 120 issues a request to the "last activity" URL of external system 292. This request has an associated request time that is stored within integration module 120, such as in the centralized data store or within the user's account. This request initiates the retrieval of the time when the user was "last active" upon that particular external system, i.e., the last time the user performed an action, a request, input information, or the like.

In the event that the user has timed-out on that particular external system, i.e., is not performing actions and the session has been terminated, the "last active" time for that user is taken to be at the beginning of the "epoch" (time "0"). When that is the case, the stored status information for that external system is changed to logged-out or inactive.

In the event that the user has not timed-out on that particular external system, the "last active" time for the user is delivered to integration module 120. This will be compared to the stored value for the "last active" time as reported by all external systems thus far. In the event that the newly reported "last active" time is more recent than the stored value for the "last active" time, the stored value for the "last active" time is changed to equal the new "last active" time. Thus, at the end of the iteration over all known and logged-in systems, integration module 120 has the most recent "last active" time across all known external systems 292 for that user. In some embodiment, integration module 120 can stop the process after encountering recent activity in a single external system, thus avoiding excessive use of resources.

By doing so, this allows coordination of the time-out across integration module 120 and the external systems 292 in a manner that preserves the semantics of the configured time-out value. In the event that the last activity attribute, containing the "last active" time is more than a maximum time-out value allowable by integration module 120, i.e., the "time-out period," the user is logged out according to the already-described coordinated log-out operation.

When the user has timed-out of all external systems that the user created session upon during the session on integration module 120, integration module 120 logs-out the user according to the already-described log-out operation.

Figure 11:
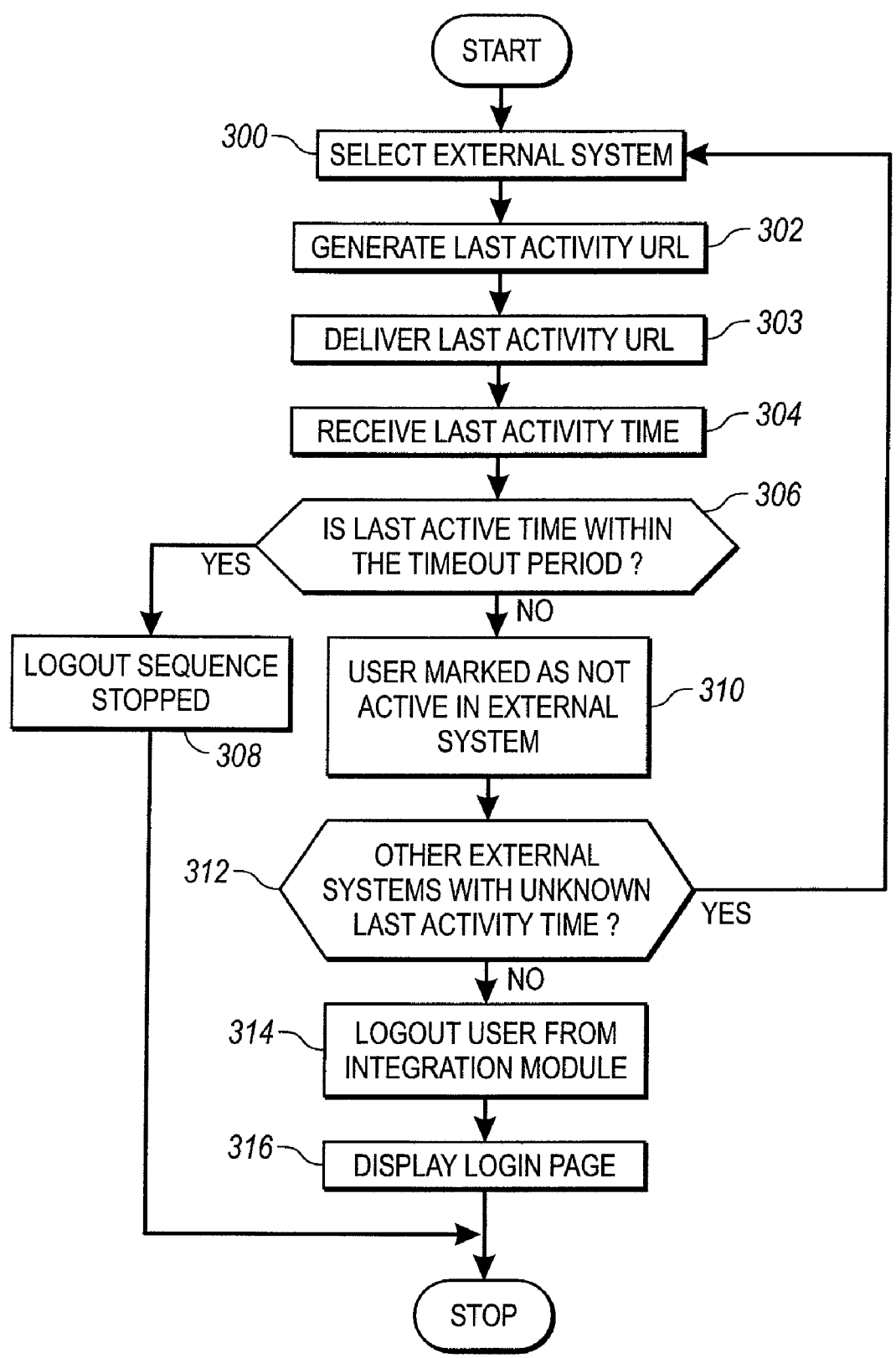
FIG. 11 is still another flow diagram representing an illustrative flow of data through the system illustrated in FIGS. 2-3 when the user is timed-out from the integration module as illustrated in FIG. 10.

Referring now to FIG. 11, depicted is a flow diagram describing a time-out procedure for the user and/or user module from integration module 120 and/or external system 292. In this embodiment, a user utilizing user module 290 is inactive in his/her use of the sessions or products associated with integration module 120 for longer than the time-out period. This inactivity triggers integration module 120 to initiate a log-out sequence. In this embodiment, integration module 120 selects a first external system that the user and/or user module has been authenticated with, as represented by block 300. The integration module 120 then generates a last activity URL for external system 292, as represented by block 302.

The integration module 120 next delivers a request on the last activity URL of external system 292, as represented by block 303, and external system 292 returns a "last active" time. When the user has an active session on external system 292, integration module 120 receives the "last active" time, as represented by block 304, otherwise external system 292 returns a "not active" time.

When integration module 120 receives the "last active" time, integration module 120 compares the received "last active" time against the "time-out period" defined by integration module 120 for system 100, as represented by block 306. When the "last active" time is less than the time-out period, the log-out process is stopped, as represented by block 308. When this is not the case, the external session attribute for external system 292 within the user's account is marked as not active, as represented by block 310.

Following identifying that a user has an active session or no session on a first external system, integration module 120 queries whether there are other external systems 292 to which the user has been authenticated and from which the "last active" time has not yet been received, as represented by block 312. When this is the case, then the above "last active" time determination process is repeated for each external system 292. When all external systems have been checked, then the user and/or user module is logged out of integration module 120, as represented by block 314, and the login page is displayed at user module 290, as represented by block 316.

In this way, the maximum time-out period can be defined globally by integration module 120 and not individually by external systems 292. Consequently, the present invention preserves a seamless on-line experience for the user.

Figure 12:
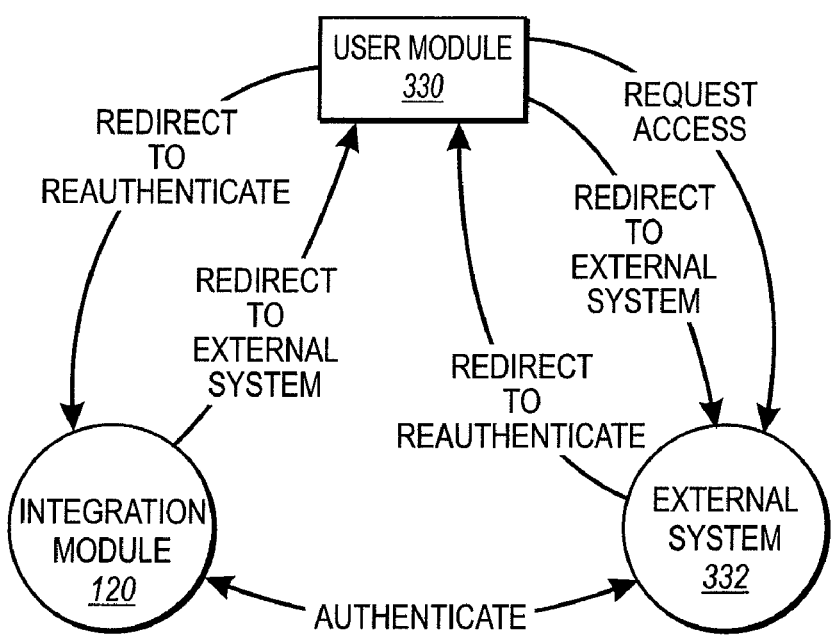
FIG. 12 is a more detailed schematic representation of the interaction of some of the modules of the system illustrated in FIGS. 2-3 when a user requests access to an external system from which the user has been timed-out or logged-out due to inactivity.

Referring now to FIG. 12, represented is a schematic representation of the interaction between user module 330, integration module 120, and external system 332 for the case where a user's session initiated through user module 330 on external system 332 is terminated because of inactivity of the user on external system 332, but the user has an active session on integration module 120. The majority of the features and functions discussed with other embodiments of user modules and external systems apply to user module 330 and external system 332 respectively.

Time-out of a user session on external system 332 occurs when the user using user module 330 has not performed any activities within a specified time-out period on the particular external system 332 to which the user has logged-in. When this condition is encountered, external system 332 performs internal purging of those current user sessions that have become inactive. Since integration module 120 is not notified of this timed-out condition, the external session attribute stored in integration module 120 is not reset and integration module 120 operates as though the user is still logged-in to external system 332 even after being timed-out of external system 332.

When the user, through user module 330, requests access to external system 332 subsequent to when the user has timed-out, external system 332 will deny access to the resources as per the process of requiring a user to login to obtain access. The external system 332 instead redirects user module 330 to be re-authenticated with integration module 120, and consequently to reauthenticate with external system 332.

When integration module 120 receives the redirected request, the user session can either be timed-out or not timed-out. In the case when the user session on integration module 1202 is timed-out, integration module 120 redirects the request to the login page. The effect of this operation is that the request to external system 332 results in a login page being displayed to the user through user module 330, which is desired effect of a unified application space.

In the case where the user session is still active on integration module 120, integration module 120 recognizes the redirect request as a request to reauthenticate the user automatically to the specified external system 332. Upon successful re-authentication, integration module 330 will redirect the request back to the original URL requested by the user upon external system 332, resulting in a seamless experience for the user.

Figure 13:
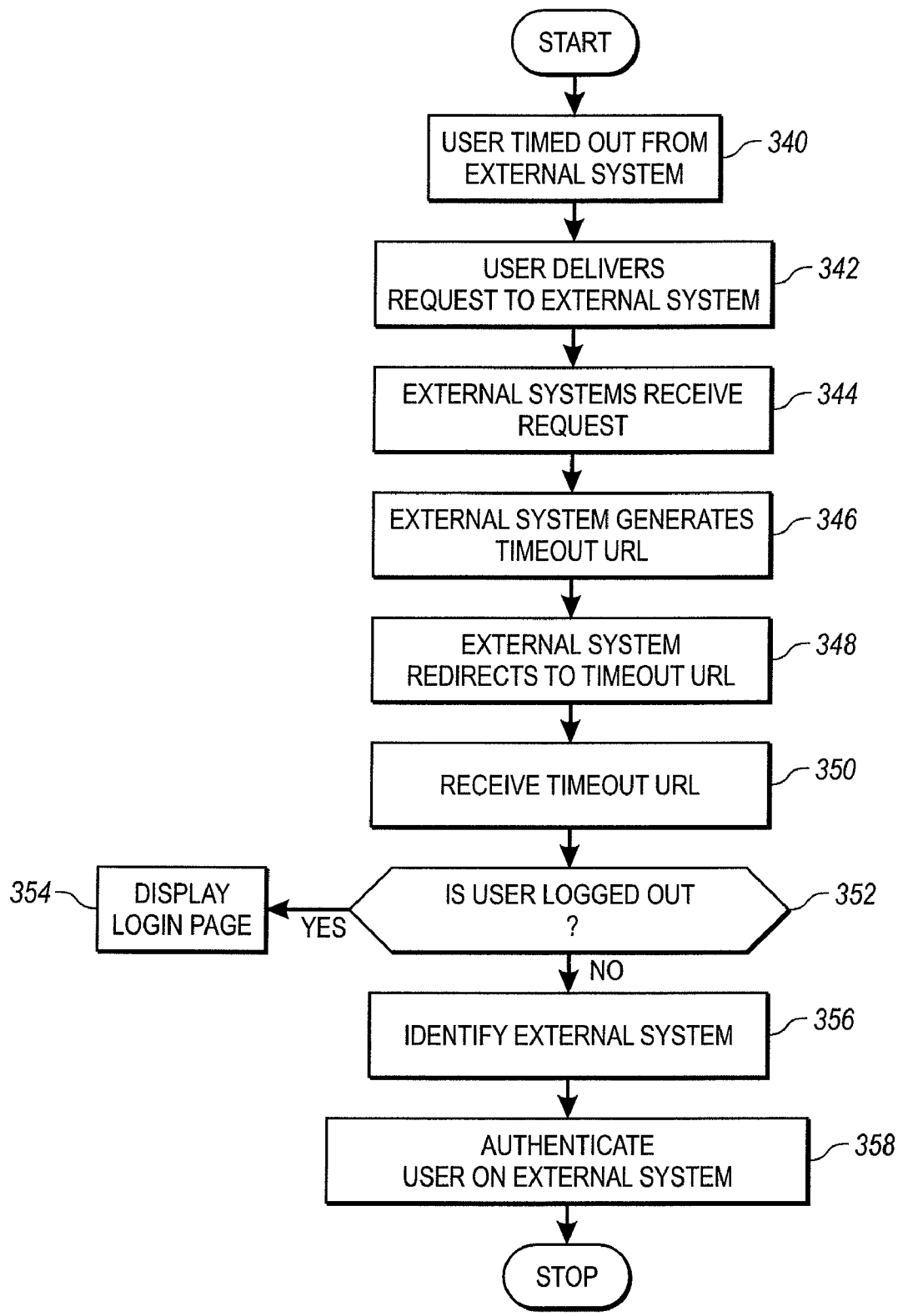
FIG. 13 is a flow diagram representing an illustrative flow of data through the system illustrated in FIGS. 2-3 upon the occurrence of the event depicted in FIG. 12.

Referring now to FIG. 13, represented is a flow diagram describing the process whereby the user has access to an external system 332 from which the user utilizing user module 330 has been timed-out for inactivity. In this embodiment, the user utilizing user module 330 is inactive in an external system 332 for a period longer than the time-out period allowed on that external system 332, and the external system session is terminated. However, there is a possibility that the user is still logged-in to integration module 120 and still has a browser window open with links that will result in a denial of access to a particular external system, i.e., stale links. In this event, when the user selects one of those stale links, the method depicted in FIG. 13 is performed.

After the user is logged-out of external system 332 for inactivity, as represented by block 340, the present method is initiated as user module 330 delivers a URL request to external system 332, as represented by block 342. Although external system 332 receives the URL request, as represented by block 344, the user, through user module 330, is denied access because he/she has been logged out. The external system 332 then uses either cookie information or other access information stored within external system 332 to generate a time-out URL that refers to the integration module 120, as represented by block 346.

The external system 332 next issues a redirect to the time-out URL as represented by block 348. This time-out URL can specify either the HyperText Transport Protocol (HTTP) or the secure HyperText Transfer Protocol (HTTPS).

This time-out URL includes the original destination URL selected by the user upon the user making a request to access the external system through the user module. When cookies are used, as the time-out URL is delivered to integration module 120, a redirect message is sent to the user module that includes a "cookie killer" that removes the session cookie from the user module for that external system 332.

After receiving the time-out URL, as represented by block 350, integration module 120 then queries the "last active" time on integration module 120, i.e., checks the last activity attribute. If the user is timed-out of integration module 120, then user module 330 is redirected to the login page, as represented by block 354.

If the user is not timed-out of integration module 120, integration module 120 re-authenticates the user onto external system 332 using the processes described herein.

This re-authentication is performed without notifying the user of the time-out condition upon external system 332, thereby preserving a seamless experience for the user. Instead, integration module 120 identifies external system 332 from the redirected time-out request, as represented by block 356, and initiates the authentication sequence to enable the user to access the external system 120 through user module 330 in a seamless fashion, as represented by block 358. For example, delivering a request to authenticate the user, receiving access information from the external system, and delivering the access information to the user module to enable the user module to automatically authenticate the user to the external system and create an active session thereupon. In this manner, the user's session is re-established with the external system 330.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system comprising a plurality of external systems upon which a user module can create active sessions and an integration module that stores a time-out period and facilitates communication to a plurality of external systems, a method for coordinating maintenance of active sessions on the integration module and one or more of the plurality of external systems, the method comprising:

upon a user module transmitting data to an integration module following the expiration of a time-out period associated with the integration module, identifying upon which of a plurality of external systems the user module has an active session;

transmitting to each of the plurality of external systems upon which the user module has the active session a request to specify a last active time of the user module on the respective external systems of the plurality of external systems, the request having an associated request time;

receiving from the plurality of external systems a response identifying the last active time of the user module on each of the plurality of external systems; and defining a last activity attribute for the integration module, the last activity attributed comprising a value equal to the last active time received from the plurality of external systems that is closest to the request time, wherein the active session is maintained upon the integration module and at least one of the plurality of external systems.

2. The method as recited in claim 1, wherein the integration module acts as an interface between the user and the plurality of external systems.

3. The method as recited in claim 1, wherein the system comprises at least one administrator, the administrator defining the time-out period.

4. The method as recited in claim 1, wherein the integration module controls access to the plurality of external systems.

5. The method as recited in claim 1, wherein the user module comprises a browser.

6. The method as recited in claim 1, wherein identifying upon which of the plurality of external systems the user module has the active session comprises searching a list of status information stored at the integration module.

7. The method as recited in claim 1, wherein identifying upon which of the plurality of external systems the user module has the active session comprises external session attributes.

8. The method as recited in claim 1, wherein transmitting a request to the plurality of external systems comprises identifying a last activity uniform resource locator associated with each of the plurality of external systems and delivering a request to the last activity uniform resource locator.

9. The method as recited in claim 1, where the last active attribute is the same for both the user module and the integration module.

10. The method as recited in claim 1, further comprising terminating the active session upon the integration module and de-authenticating the user from each of the plurality of external systems in the event that the last active time stored at the integration module exceeds the time-out period.

11. A computer product for implementing, in a system comprising one or more external systems and an integration module for facilitating communication between a user module and the one or more external systems, a method for controlling access to the one or more external systems, the computer program product comprising:

a computer readable medium carrying computer-executable instructions for implementing the method, wherein the computer-executable instructions, when executed by the integration module, cause the system to perform:

upon a user module requesting or transmitting data to an integration module after a time-out period, identify upon which of a plurality of external systems a user module has an active session;

transmitting to the one or more external systems to which the user module has an active session a request to specify a last active time of the user module on the one or more external systems, the request having an associated request time;

receiving from the one or more external systems a response identifying the last active time of the user module on each of one or more external systems; and defining a last activity attribute for the integration module, the last activity attributed comprising a value equal to the last active time received from the one or more external systems that is closest to the request time, wherein an active session is maintained upon the integration module and at least one of the one or more external systems.

* * * * *